US009524215B1

(12) United States Patent
Khandelwal et al.

(10) Patent No.: US 9,524,215 B1
(45) Date of Patent: Dec. 20, 2016

(54) SYSTEMS AND METHODS FOR MANAGING VIRTUAL MACHINE BACKUPS

(71) Applicant: Symantec Corporation, Mountain View, CA (US)

(72) Inventors: Atul Khandelwal, Maharashtra (IN); Sameer Mahajan, Karvenagar (IN)

(73) Assignee: Veritas Technologies LLC, Mountain View, CA (US)

( * ) Notice: Subject to any disclaimer, the term of this patent is extended or adjusted under 35 U.S.C. 154(b) by 270 days.

(21) Appl. No.: 13/954,602

(22) Filed: Jul. 30, 2013

(51) Int. Cl.
*G06F 12/00* (2006.01)
*G06F 13/00* (2006.01)
*G06F 13/28* (2006.01)
*G06F 11/14* (2006.01)

(52) U.S. Cl.
CPC .................. *G06F 11/1446* (2013.01)

(58) Field of Classification Search
CPC .................................. G06F 11/1446
See application file for complete search history.

(56) References Cited

U.S. PATENT DOCUMENTS

| | | | | |
|---|---|---|---|---|
| 7,254,682 B1* | 8/2007 | Arbon | | 711/161 |
| 7,346,623 B2* | 3/2008 | Prahlad | | G06F 11/1435 |
| 8,239,706 B1* | 8/2012 | Yang | | 714/6.24 |
| 8,364,643 B2* | 1/2013 | Benari | | 707/649 |
| 8,402,309 B2* | 3/2013 | Timashev | | G06F 9/44589 |
| | | | | 707/679 |
| 8,473,462 B1* | 6/2013 | Banerjee | | 707/640 |
| 8,499,297 B2* | 7/2013 | Chen | | G06F 11/1438 |
| | | | | 718/1 |
| 8,504,526 B2* | 8/2013 | Gokhale | | G06F 11/1471 |
| | | | | 707/648 |
| 9,110,604 B2* | 8/2015 | Hsu | | G06F 3/0655 |
| 9,298,392 B2* | 3/2016 | Hsu | | G06F 3/0655 |
| 9,372,761 B1* | 6/2016 | Chai | | G06F 11/1458 |
| 9,384,254 B2* | 7/2016 | Tekade | | G06F 17/30581 |
| 2006/0129562 A1* | 6/2006 | Pulamarasetti | | G06F 17/30008 |
| 2010/0005258 A1* | 1/2010 | Westenberg | | 711/162 |
| 2012/0216052 A1* | 8/2012 | Dunn | | G06F 21/78 |
| | | | | 713/193 |
| 2014/0149695 A1* | 5/2014 | Zaslavsky | | G06F 12/16 |
| | | | | 711/162 |

(Continued)

OTHER PUBLICATIONS

Understanding RPO and RTO; Jaspreet Singh; Mar. 22, 2008; retrieved from http://www.druva.com/blog/understanding-rpo-and-rto/ on Apr. 6, 2016 (4 pages).*

(Continued)

*Primary Examiner* — Daniel C Chappell
(74) *Attorney, Agent, or Firm* — FisherBroyles LLC

(57) ABSTRACT

A computer-implemented method for managing virtual machine backups may include (1) identifying a maximum recovery point objective for a virtual machine with a virtual machine disk file on a storage device with snapshot capabilities, (2) identifying an available snapshot of the storage device that contains the virtual machine disk file, (3) determining that the snapshot's timestamp is within the maximum recovery point objective, and (4) constructing a backup of the virtual machine using the snapshot, instead of creating the backup from the virtual machine disk file. Various other methods, systems, and computer-readable media are also disclosed.

20 Claims, 6 Drawing Sheets

(56) References Cited

U.S. PATENT DOCUMENTS

| | | | |
|---|---|---|---|
| 2014/0215265 A1* | 7/2014 | Mohanta | G06F 11/1412 714/15 |
| 2014/0365740 A1* | 12/2014 | Vasilyev | G06F 11/1451 711/162 |
| 2016/0085574 A1* | 3/2016 | Dornemann | G06F 9/45558 718/1 |
| 2016/0085575 A1* | 3/2016 | Dornemann | G06F 9/45558 718/1 |
| 2016/0179568 A1* | 6/2016 | Bezbaruah | G06F 9/45558 718/1 |

OTHER PUBLICATIONS

RDMA Based Replication of Multiprocessor Virtual Machines over High-Performance Interconnects; Gerofi et al; 2011 IEEE International Conference on Cluster Computing; Sep. 26-30, 2011; pp. 35-44 (10 pages).*

Parallax: virtual disks for virtual machines; Meyer et al; Proceedings of the 3rd ACM SIGOPS/EuroSys European Conference on Computer Systems 2008; Apr. 1, 2008; pp. 41-54 (14 pages).*

* cited by examiner

SYSTEMS AND METHODS FOR MANAGING VIRTUAL MACHINE BACKUPS

BACKGROUND

Virtual machines have long been used in software development and software testing environments to facilitate development and testing of applications in multiple operating systems without a proportional investment in hardware. More recently, virtual machines have been used in increasing numbers to more efficiently utilize hardware, ease deployment of new systems and software, facilitate disaster recovery, and implement cloud infrastructures.

Concurrent with the growth in the use of virtual machines, storage devices and storage architectures have been developed to provide for the ever-increasing storage needs of proliferating applications and systems. Some storage devices, such as disk arrays, may also include advanced features, such as snapshotting, rollback, and replication, designed to decrease the likelihood of data loss.

Unfortunately, as the number of virtual machines and applications running concurrently on a system increase, it becomes increasingly likely that advanced features of storage devices will be used inefficiently. For example, a virtual machine may trigger a hardware snapshot of the disk array its volume resides on, even though another virtual machine or application running in a virtual machine on the same system may have triggered a snapshot seconds before. When data is to be restored, rollback or replication features may be applied to make the process more efficient, but the utilization of such features is subject to human error and the system administrator's awareness of system capabilities and configuration details. Accordingly, the instant disclosure identifies and addresses a need for additional and improved systems and methods for managing virtual machine backups.

SUMMARY

As will be described in greater detail below, the instant disclosure generally relates to systems and methods for managing virtual machine backups by utilizing the advanced features of underlying storage systems and devices during both backup and restoration of virtual machines. In one example, a computer-implemented method for managing virtual machine backups may include (1) identifying a maximum recovery point objective for a virtual machine with an associated virtual machine disk file on a storage device with snapshot capabilities, (2) identifying an available snapshot of the storage device containing the virtual machine disk file, (3) determining that the snapshot's timestamp is within the maximum recovery point objective, and then, (4) in response to determining that snapshot's timestamp is within the maximum recovery point objective, constructing a backup of the virtual machine from the snapshot instead of creating the backup from the virtual machine disk file.

In one example, the snapshot of the storage device containing the virtual machine disk file may represent a device-based snapshot produced by the storage device. In another example, the snapshot may have been created by another backup operation not related to the virtual machine.

In some examples, the backup of the virtual machine may be constructed by extending the snapshot's retention time to the maximum recovery point objective. In other examples, when the storage device possesses replication capabilities, the backup of the virtual machine may be constructed by performing a replication of the snapshot and/or by copying a replicated copy of the snapshot.

In one embodiment, the computer-implemented method may also include restoring the virtual machine backup by (1) identifying a plurality of snapshots of the storage device on which the virtual machine disk file resides, (2) selecting, by comparing characteristics of the plurality of snapshots, a preferred snapshot from within the plurality of snapshots, and then (3) restoring the virtual machine backup from the preferred snapshot. The computer-implemented method may also include restoring the virtual machine backup by copying files pertaining to the virtual machine from the snapshot of the storage device containing the virtual machine disk file. In examples where the storage device possesses snapshot rollback capabilities, the computer-implemented method may include restoring the virtual machine backup by performing a snapshot rollback of files pertaining to the virtual machine. In examples where the storage device possesses replication capabilities, the computer-implemented method may include restoring the virtual machine backup by constructing configuration files for an alternate storage location and replicating the snapshot to that alternate location.

In some examples, the computer-implemented method may include restoring the virtual machine backup by copying the snapshot to an alternate storage device with replication capabilities and then replicating the snapshot to the storage device. In examples where the storage device possesses replication capabilities, the snapshot has been previously copied to an alternate storage location, and modifications to the virtual machine disk file have been replicated to an alternate storage device, the computer-implemented method may include restoring the virtual machine by copying the snapshot from the alternate storage location to the storage device and then replicating the modifications to the virtual machine disk file from the alternate storage device to the virtual machine disk file.

In one embodiment, a system for implementing the above-described method may include a recovery point objective identification module that identifies a maximum recovery point objective for a virtual machine with an associated virtual machine disk file on a storage device with snapshot capabilities. The system may also include a snapshot identification module that identifies an available snapshot of the storage device containing the virtual machine disk file and determines that the snapshot's timestamp is within the maximum recovery point objective. The system may additionally include a backup construction module that constructs a backup of the virtual machine from the snapshot instead of creating the backup from the virtual machine disk file. The system may also include at least one processor that executes the recovery point identification module, the snapshot identification module, and the backup construction module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a maximum recovery point objective for a virtual machine with an associated virtual machine disk file on a storage device with snapshot capabilities, (2) identify an available snapshot of the storage device containing virtual machine disk file, (3) determine that the snapshot's timestamp lies within the maximum recovery point objective, and then, (4) in response to determining that the snapshot's timestamp is within the maximum recovery point objective, construct a backup of the virtual machine from the snapshot instead of creating the backup from the virtual machine disk file.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
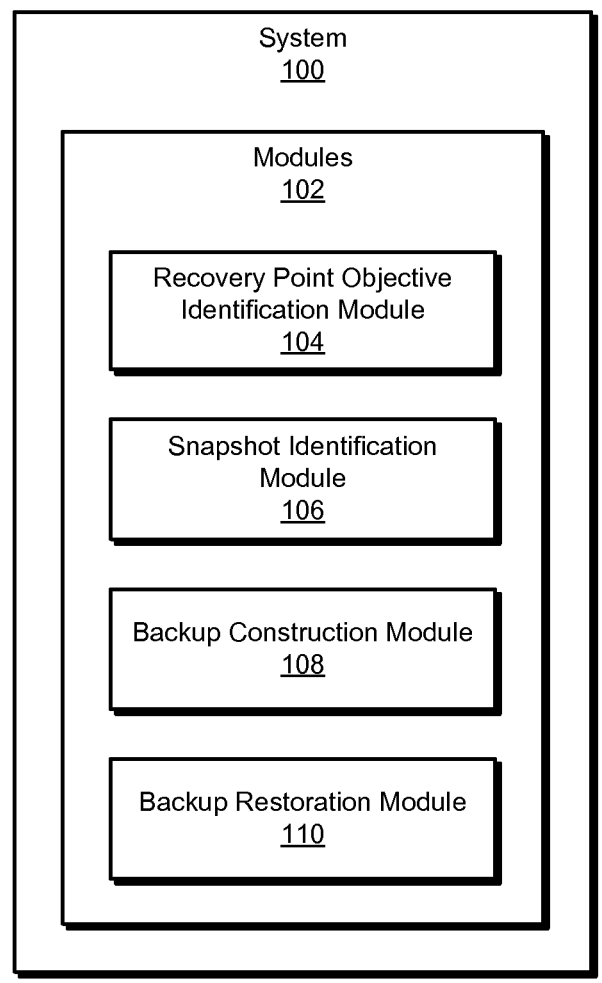
FIG. 1 is a block diagram of an exemplary system for managing virtual machine backups.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for managing virtual machine backups. As will be explained in greater detail below, by taking advantage of the advanced features of modern storage systems (such as snapshotting, rollback, and replication capabilities), the systems and methods described herein may more efficiently create and/or manage virtual machine backups. For example, by using device-based snapshots to create virtual machine backups, the systems and methods described herein may increase the speed of, and reduce the commitment of host and/or network resources involved in, backing up a virtual machine. This may in turn enable backup systems to create virtual machine backups more often, potentially decreasing the risk of loss of frequently changing data. In addition, the use of tape backup systems may be reduced and/or eliminated, potentially reducing costs and/or recovery time. Taken together, the systems and methods described herein may result in better protection and management of virtual machines and virtual machine snapshots on storage devices.

Figure 2:
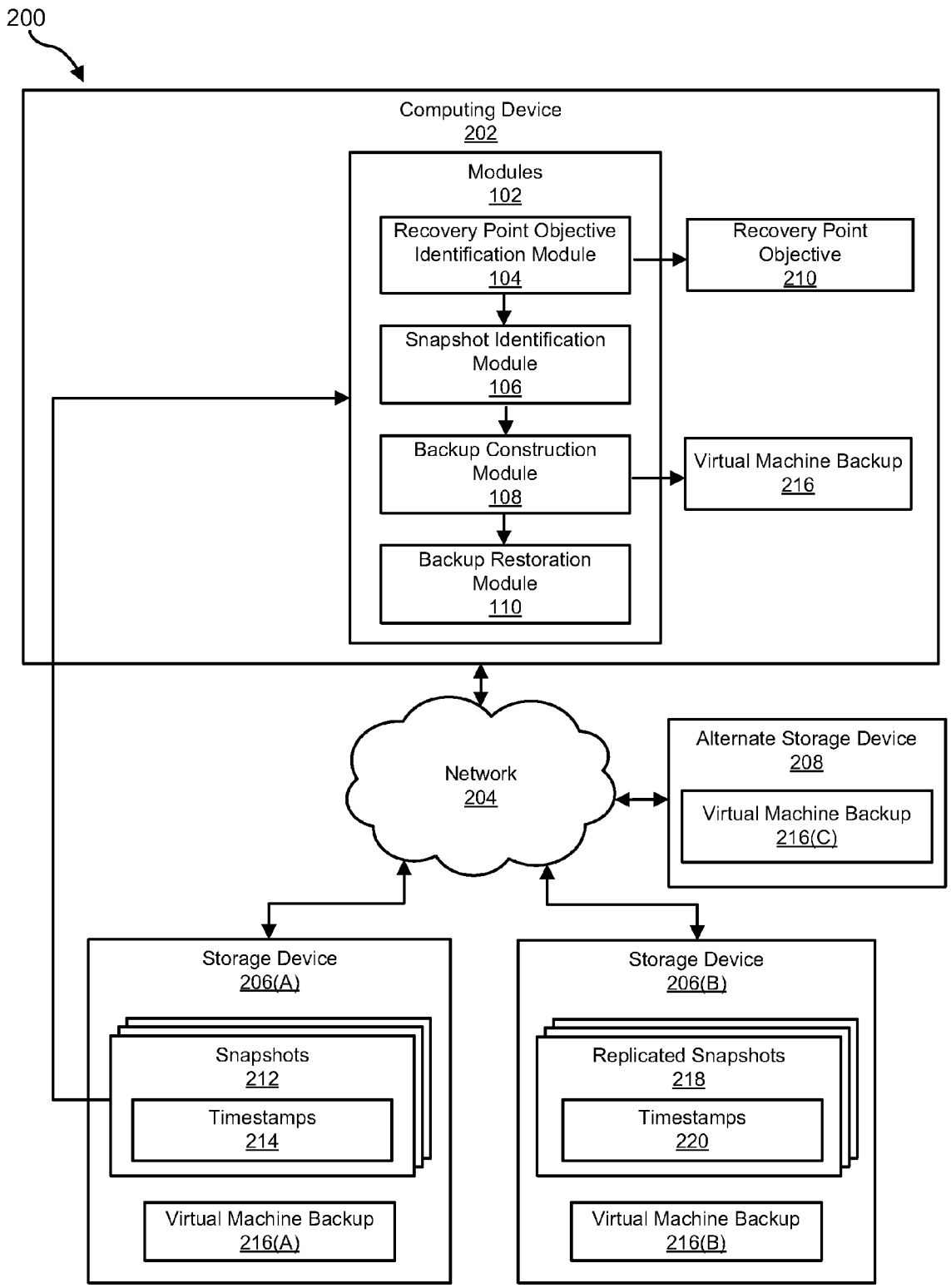
FIG. 2 is a block diagram of an exemplary system for managing virtual machine backups.
Figure 3:
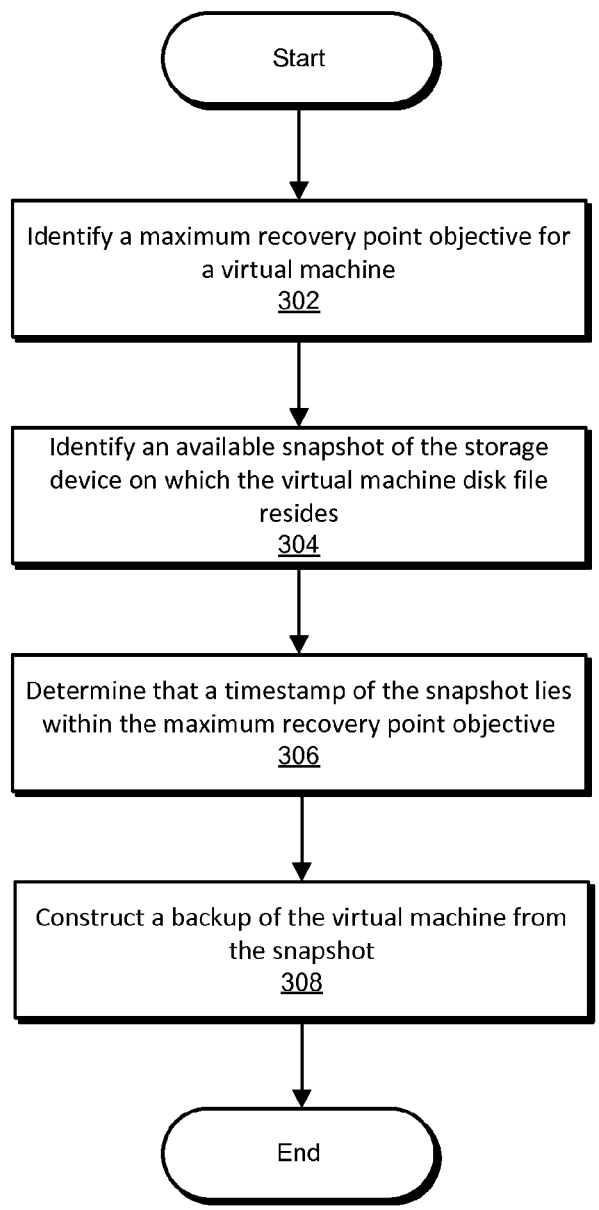
FIG. 3 is a flow diagram of an exemplary method for managing virtual machine backups.
Figure 4:
FIG. 4 is a block diagram of an exemplary virtual machine configuration file for managing virtual machine backups.

The following will provide, with reference to FIGS. 1-2 and 4, detailed descriptions of exemplary systems for managing virtual machine backups. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for managing virtual machine backups. As illustrated in this figure, exemplary system 100 may include one or more modules 102 for performing one or more tasks. For example, and as will be explained in greater detail below, exemplary system 100 may include a recovery point objective identification module 104 that identifies a maximum recovery point objective for a virtual machine with snapshot capabilities. Exemplary system 100 may also include a snapshot identification module 106 that identifies an available snapshot of the storage device containing the virtual machine disk file and determines that the snapshot's timestamp is within the maximum recovery point objective.

In addition, and as will be described in greater detail below, exemplary system 100 may include a backup construction module 108 that constructs a backup of the virtual machine from the snapshot, rather than backing up the virtual machine disk file. Exemplary system 100 may also include a backup restoration module 110 that restores the virtual machine backup by various methods described in greater detail below. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202, storage devices 206(A) and 206(B), and/or alternate storage device 208), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a plurality of storage devices 206(A) and 206(B) and/or an alternate storage device 208 via a network 204. In some examples, computing device 202 may be programmed with one or more of modules 102. Additionally or alternatively, storage devices 206(A) and 206(B) and/or alternate storage device 208 may be programmed with one or more of modules 102.

In one embodiment, one or more of modules 102 from FIG. 1 may, when executed by at least one processor of computing device 202, storage devices 206(A) and 206(B), and/or alternate storage device 208, facilitate computing device 202, storage devices 206(A) and 206(B), and/or alternate storage device 208 in managing virtual machine backups. For example, and as will be described in greater detail below, one or more of modules 102 may cause computing device 202, storage devices 206(A) and 206(B), and/or alternate storage device 208 to (1) identify a maximum recovery point objective (e.g., recovery point objective 210) for a virtual machine with an associated virtual machine disk file on a storage device that possesses snapshot capabilities (e.g., storage device 206(A)), (2) identify an available snapshot (e.g., snapshot 212) of the storage device on which the virtual machine disk file resides, (3) determine that a timestamp of the snapshot (e.g., timestamp 214) lies within the maximum recovery point objective, and (4) in response to determining that the timestamp of the snapshot lies within the maximum recovery point objective, construct a backup (e.g., virtual machine backup 216) of the virtual machine from the snapshot instead of creating the backup from the virtual machine disk file.

One or more of modules 102 from FIG. 1 may also, when executed by at least one processor of computing device 202, storage devices 206(A) and 206(B), and/or alternate storage device 208, facilitate computing device 202, storage devices 206(A) and 206(B), and/or alternate storage device 208 in restoring the virtual machine backup by copying files pertaining to the virtual machine from the snapshot of the storage device on which the virtual machine disk file resides.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 510 in FIG. 5, or any other suitable computing device.

Storage devices 206(A) and 206(B) and alternate storage device 208 generally represent any type or form of computing device that is capable of storing data as files or addressable data blocks. Examples of storage devices 206(A) and 206(B) and alternate storage device 208 include, without limitation, disk arrays, storage area networks, network attached storage, file servers, magnetic disks, optical disks, magnetic tape, or any other suitable storage device.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between computing device 202, storage devices 206(A) and 206(B), and/or alternate storage device 208.

FIG. 3 is a flow diagram of an exemplary computer-implemented method 300 for managing virtual machine backups. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify a maximum recovery point objective for a virtual machine with an associated virtual machine disk file on a storage device that possesses snapshot capabilities. For example, at step 302 recovery point objective identification module 104 may, as part of computing device 202 in FIG. 2, identify recovery point objective 210 as the maximum recovery point objective for a virtual machine with an associated virtual machine disk file on storage device 206(A).

As used herein, the term "virtual machine" generally refers to a software-implemented abstraction of an operating environment that is presented to the application layer of a system. A virtual machine may be based on the specification of a hypothetical computer or emulate the architecture and functions of a real world computer.

In addition, the term "virtual machine disk file," as used herein, generally refers to a stored representation of a virtual machine. Although used in the singular, a virtual machine disk file may include one or more files in a host operating system. In addition, while the abbreviation "VMDK" may refer to a specific format of virtual machine disk file, it is used herein as a synonym for the generic term, and may also apply to virtual machine disk files stored in other formats.

As used herein, the term "recovery point objective" (or simply "RPO") generally refers to the maximum time period of data loss that is tolerable in the event of an incident that impacts system operation. For example, if a virtual machine has an RPO of 1 hour, then, in the event of an incident that impacts operation of the virtual machine (e.g., user error that results in accidental deletion of the virtual machine), a version of the virtual machine no older than one hour is intended to be available to be restored. In some examples, the length of a recovery point objective may depend on the perceived criticality of the virtual machine data. RPOs may range from hours to days, but may be as little as 5 minutes or less.

In addition, the term "backup," as used herein generally refers to any procedure (and/or the results of any such procedure) used to back up, duplicate, and/or protect data. Similarly, the term "snapshot," as used herein, generally refers to any representation of a volume of data and/or a portion of a volume of data at a certain point in time. Examples of snapshots include, without limitation, hardware and software-based snapshots, space-optimized and full snapshots, disk-only snapshots, quiesced snapshots, and disk and memory snapshots.

The storage devices described herein may possess any of a variety of snapshot capabilities. For example, storage devices 206(A) or 206(B) may be capable of creating a space-optimized read/write snapshot of a volume of data (e.g., a snapshot that references the volume in its original state at the time the snapshot is taken and records subsequent changes made to the volume without disturbing the view of the original state). In some examples, storage devices 206(A) or 206(B) may create a snapshot of a volume of data for a scheduled backup of the volume of data. In these examples, the snapshot may represent a point-in-time view of the volume to be backed up.

The systems described herein may perform step 302 in a variety of ways. In one example, recovery point objective identification module 104 may utilize a web application or utility program to obtain a recovery point objective for a virtual machine from a system administrator. In another example, recovery point objective identification module 104 may identify the recovery point objective by analyzing a backup or hardware snapshot schedule for the virtual machine. When the snapshot of the storage device on which the virtual disk resides is created by a backup operation not related to the virtual machine (for example, a backup operation initiated by an application running in another virtual machine), recovery point objective identification module 104 may identify the maximum recovery point objective by obtaining the retention time for the snapshot.

Returning to FIG. 3, at step 304 one or more of the systems described herein may identify an available snapshot of the storage device on which the virtual machine disk file resides. For example, at step 304 snapshot identification module 106 may, as part of computing system 200 in FIG. 2, identify an available or existing snapshot 212 of storage device 206(A) (which, as detailed above, may contain a virtual machine disk file for the virtual machine).

The systems described herein may perform step 304 in a variety of ways. For example, a snapshot of storage device 206(A) (e.g., snapshot 212) containing a virtual machine disk file for the virtual machine may have been previously created by a backup operation related to a different virtual machine also utilizing storage device 206(A), by an application running in one of these different virtual machines, and/or by storage device 206(A) itself for a purpose unrelated to the virtual machine (e.g., a hardware-based snapshot created by storage device 206(A) in accordance with a device-based backup policy). In these examples, snapshot identification module 106 may identify a suitable snapshot that includes the virtual machine disk file from among these existing snapshots that are unrelated to the virtual machine. Similarly, if storage device 206(B) is configured to replicate storage device 206(A), then snapshot identification module 106 may determine that storage device 206(B) contains a replicated snapshot 218 of storage device 206(A) that contains the virtual machine disk file for the virtual machine.

Returning to FIG. 3, at step 306 one or more of the systems described herein may determine that a timestamp of the snapshot lies within the maximum recovery point objective. For example, at step 306 snapshot identification module 106 may, as part of computing system 200 in FIG. 2, determine that timestamp 214 of snapshot 212 of storage device 206(A) lies within recovery point objective 210.

The systems described herein may perform step 306 in a variety of ways. For example, a snapshot of storage device 206(A) (e.g., snapshot 212) containing a virtual machine disk file for the virtual machine may have been previously created by a backup operation related to a different virtual machine also utilizing storage device 206(A), by an application running in one of these different virtual machines, and/or by storage device 206(A) itself for a purpose unrelated to the virtual machine (e.g., a hardware-based snapshot created by storage device 206(A) in accordance with a device-based backup policy). In these examples, snapshot identification module 106 may determine that at least one of these existing snapshots that are unrelated to the virtual machine both includes the virtual machine disk file and has a timestamp that lies within recovery point objective 210. Similarly, if storage device 206(B) is configured to replicate storage device 206(A), then snapshot identification module 106 may determine that storage device 206(B) contains a replicated snapshot 218 of storage device 206(A) that both contains the virtual machine disk file for the virtual machine and has a timestamp 220 that lies within recovery point objective 210.

Returning to FIG. 3, at step 308 one or more of the systems described herein may, in response to determining that the timestamp of the snapshot lies within the maximum recovery point objective, construct a backup of the virtual machine from the snapshot instead of creating the backup from the virtual machine disk file. For example, backup construction module 108 may construct a virtual machine backup 216(A) of the virtual machine on storage device 206(A) from existing snapshot 212 instead of creating virtual machine backup 216(A) from the virtual machine's disk file.

The systems described herein may perform step 308 in a variety of ways. In one example, the systems described herein may construct a backup of the virtual machine from an existing snapshot by extending the retention time of the snapshot (which, as described above, may have been created for a purpose unrelated to the virtual machine) to the maximum recovery point objective. For example, backup construction module 108 may construct a virtual machine backup 216(A) of the virtual machine on storage device 206(A) from snapshot 212 by extending the retention time of snapshot 212 to maximum recovery point objective 210. Similarly, if storage device 206(B) contains a replicated snapshot 218 of storage device 206(A) that contains the virtual machine disk file for the virtual machine, then backup construction module 108 may construct a virtual machine backup 216(B) of the virtual machine by extending the retention time of replicated snapshot 218 on storage device 206(B) to maximum recovery point objective 210.

In some examples, the capabilities of the storage device may be considered and/or leveraged when constructing the backup of the virtual machine. For example, if the storage device possesses both snapshotting and replication capabilities, and a user of the system wishes to create or store a backup of the virtual machine on an alternate storage device, then the systems described herein may cause the storage device to replicate an existing snapshot of the storage device (which, as described above, may have been created for a purpose unrelated to the virtual machine) to another storage device for use in creating a backup of the virtual machine. Using FIG. 2 as an example, backup construction module 108 may cause storage device 206(A) to replicate snapshot 212 to a separate storage device 206(B) as replicated snapshot 218. Backup construction module 108 may then designate replicated snapshot 218 as, or use replicated snapshot 218 to construct, virtual machine backup 216(B).

In other examples, the storage device may only possess snapshotting capabilities. In such examples, if a user of the system wishes to create or store a backup of the virtual machine on an alternate storage device, the systems described herein may construct a backup of the virtual machine by copying an existing snapshot of the storage device to a storage device that possesses replication capabilities, which may in turn replicate the snapshot to another storage device for use in creating a backup of the virtual machine. Using FIG. 2 as an example, backup construction module 108 may copy a snapshot from a storage device that only possesses snapshotting capabilities (not illustrated) to storage device 206(A), which possesses replication capabilities. Backup construction module 108 may (1) cause storage device 206(A) to replicate this snapshot to storage device 206(B) as replicated snapshot 218 and then (2) designate replicated snapshot 218 as, or use replicated snapshot 218 to construct, virtual machine backup 216(B).

In other examples, the systems described herein may construct a backup of the virtual machine from an existing snapshot by copying a replicated copy of the snapshot to another storage device for use in creating a backup of the virtual machine. Using FIG. 2 as an example, snapshot identification module 106 may identify a replicated snapshot 218 on storage device 206(B) that contains the virtual machine disk file for the virtual machine. In this example, backup construction module 108 may (1) copy replicated snapshot 218 from storage device 206(B) to an alternate storage device 208 and then (2) designate replicated snapshot 218 as, or use replicated snapshot 218 to construct, virtual machine backup 216(C). Backup construction module 108 may copy snapshots in any of a variety of ways, including through the use of backup utilities, such as TAR, or commercial backup software.

As with backups, the capabilities of storage devices may also be considered and/or leveraged when restoring virtual machines. For example, if a user wishes to restore a virtual machine backup to its original storage device, and if the snapshot that was used as the basis for creating this virtual machine backup is already present and mounted on this storage device, then the systems described herein may restore the virtual machine backup by copying files pertaining to the virtual machine from the snapshot to the required location on the storage device. Using FIG. 2 as an example, backup restoration module 110 may restore virtual machine backup 216(A) by copying files pertaining to the virtual machine from snapshot 212 to the required location on storage device 206(A), thereby avoiding the need to restore virtual machine backup 216(A) from a separate backup and/or storage device.

Similarly, if a user wishes to restore a virtual machine backup to its original storage device, and if this storage device possesses snapshot rollback capabilities, then the systems described herein may restore the virtual machine backup by causing the storage device to perform a snapshot rollback of files pertaining to the virtual machine. Using FIG. 2 as an example, backup restoration module 110 may restore virtual machine backup 216(A) to storage device 206(A) by causing storage device 206(A) to discard all changes made to the virtual machine's disk file subsequent to the creation of the snapshot that was used to create virtual machine backup 216(A) (e.g., snapshot 212). This process (otherwise known as a "snapshot rollback" operation) may avoid having to restore virtual machine backup 216(A) from a separate backup and/or storage device.

Alternatively, if a user wishes to restore a virtual machine backup to an alternate storage device, and if this alternate storage device possesses replication capabilities, then the systems described herein may (1) replicate the snapshot used to create the virtual machine backup to the alternate storage device (from, e.g., the original storage device and/or a backup storage device) and then (2) copy files pertaining to the virtual machine from this replicated snapshot to the required location on the alternate storage device. Using FIG. 2 as an example, backup restoration module 110 may restore virtual machine backup 216(A) from storage device 206(A) to alternate storage device 208 by (1) replicating snapshot 212 to alternate storage device 208 and then (2) copying files pertaining to the virtual machine from snapshot 212 to the required location on alternate storage device 208, thereby avoiding the need to directly copy virtual machine backup 216(A) from storage device 206(A) to alternate storage device 208.

Similarly, if a user wishes to restore a virtual machine backup to a storage device via replication, but the storage device that contains a copy of the virtual machine backup does not possess replication capabilities, then the systems described herein may first copy the snapshot that contains the virtual machine to an alternate storage device that possesses replication capabilities, and then cause the alternate storage device to replicate the snapshot to the desired storage device. Using FIG. 2 as an example, backup restoration module 110 may (1) copy snapshot 212 to storage device 206(A) and then (2) cause storage device 206(A) to replicate snapshot 212 to storage device 206(B) as replicated snapshot 218.

In some examples, the systems described herein may first construct configuration files pertaining to the alternate storage location before replicating the snapshot to the alternate storage location. Using FIG. 2 as an example, backup restoration module 110 may, prior to causing storage device 206(A) to replicate snapshot 212 to storage device 206(B), construct configuration files that will enable the virtual machine contained within snapshot 212 to utilize storage device 206(B) upon restoration.

FIG. 4 is a block diagram of an exemplary virtual machine configuration file 400 indicating some of the changes that may be required when constructing configuration files for restoring a virtual machine to an alternate storage device. As shown in this figure, virtual machine configuration file 400 may include a Small Computer System Interface (SCSI) settings section 402 and an Integrated Drive Electronics (IDE) settings section 404. SCSI settings section 402 may contain parameters for a SCSI disk drive used by the virtual machine, including a common name for the disk Logical Unit Number (LUN) in a storage area network (SAN), and a mode setting that indicates whether changes are immediately written to disk, discarded with the virtual machine is halted, undoable, or appended to a redo log. IDE settings section 404 may contain similar parameters for an IDE disk—in the exemplary virtual machine configuration file 400 depicted in FIG. 4, an ATAPI CDROM identified as/dev/cdrom.

When restoring a virtual machine to an alternate storage location, various aspects of the operating environment may change. As such, backup restoration module 110 may create a new virtual machine configuration file, or make appropriate modifications to an existing virtual machine configuration file, for each new operating environment. For example, the SCSI0:0.name setting in virtual machine configuration file 400 may need to be changed to indicate the correct device. In addition, when the type of hardware is different in the new operating environment (e.g., when the disk type on the alternate storage location differs from that of the system on which the virtual machine originally executed), new drivers may need to be installed on the virtual machine for it to operate properly in the new environment.

In another example, the storage device may possess replication capabilities, the snapshot may have previously been copied to an alternate storage location, and modifications to the virtual machine disk file may have been replicated to an alternate storage device. In such an example, the systems described herein may restore the virtual machine backup by copying the snapshot to the storage device from the alternate storage location and replicating the modifications to the virtual machine disk file from the alternate storage device to the storage device. Using FIG. 2 as an example, snapshot 212 may have been previously copied to alternate storage device 208 as virtual machine backup 216(C), and modifications to the virtual machine disk file may have been replicated from storage device 206(A) to storage device 206(B). In this example, backup restoration module 110 may restore the virtual machine by copying virtual machine backup 216(C) to storage device 206(A) and then replicating the modifications made subsequent to creation of snapshot 212 from storage device 206(B) back to storage device 206(A).

When multiple virtual machine backups exist, the time to restore the virtual machine may vary depending on which backup is selected for restoration. For example, a virtual machine backup may already exist on the destination storage device (e.g., a snapshot of the storage device may have been created within the maximum recovery point objective by the virtual machine, by another virtual machine utilizing the same storage device, and/or by a backup operation initiated by an application running in a virtual machine). When a virtual machine backup is available on the storage device to which it is to be restored, restoring that backup may require the least time to restore, as the data already exists on the destination storage device. Alternatively, multiple backups may exist at various points in a cascaded replication environment, where data must be replicated to the destination storage device for restoration. In this scenario, the fastest time to restore may be determined by evaluating the speed and reliability of network connections between the location of each backup and the destination storage device. As such, to reduce the amount of time required to restore a virtual machine, the systems described herein may (1) identify all available snapshots of the storage device that contains the virtual machine's disk file, (2) select, by comparing the snapshots' characteristics (such as their location or proximity to the destination storage device, etc.), the most desirable or preferred snapshot for use in restoring the virtual machine, and then (3) restore the virtual machine backup from the preferred snapshot.

As explained above, the systems and methods described herein may provide the ability to better protect virtual machines by leveraging the capabilities of storage devices, such as disk arrays, on which the virtual machines reside. As such, these systems and methods may both reduce the performance impact of virtual machine backups and overcome limitations on the number of snapshots on certain storage devices. In addition, because the capabilities of storage devices may also be considered when restoring virtual machines, the time required to perform such restore operations and the probability of human error may be reduced. Furthermore, the relationship between the copy from which the restore is performed and the capabilities of the target storage device may be considered to identify potential optimizations for the restore data movement.

Figure 5:
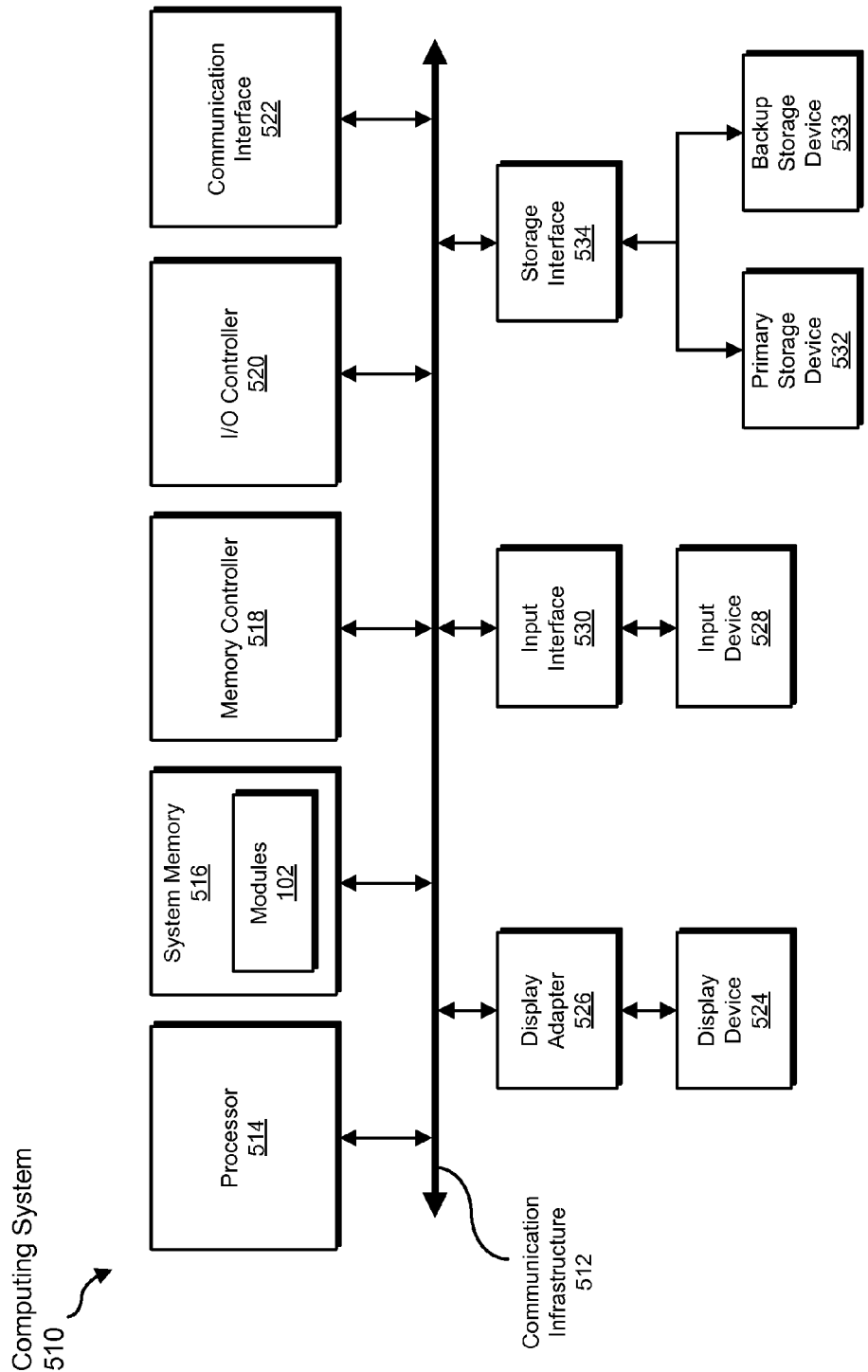
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
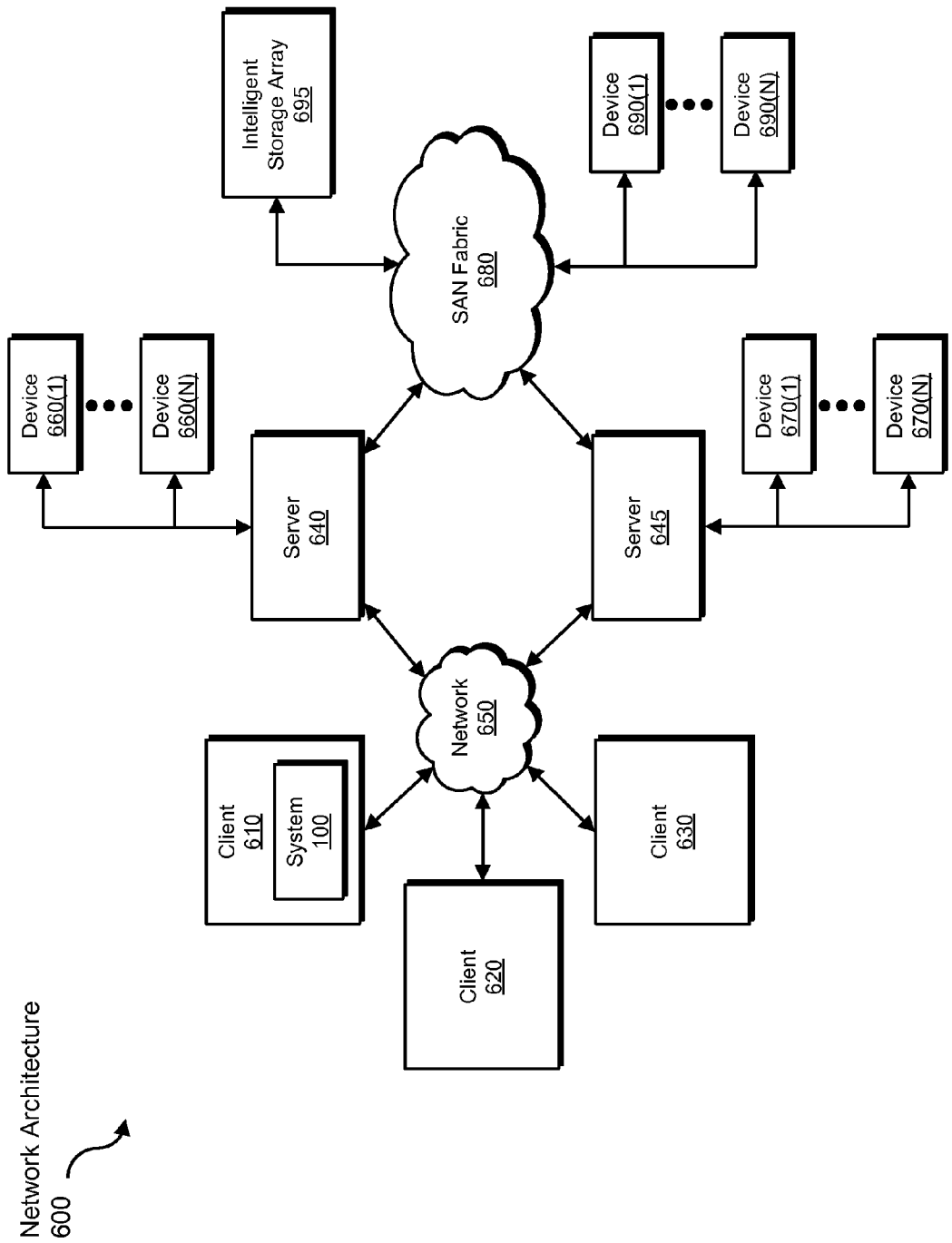
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for managing virtual machine backups.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing system into a system for managing virtual machine backups. As another example, one or more modules may transform a storage device into a backup system. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for managing virtual machine backups, at least a portion of the method being performed by a computing device comprising at least one processor, the method comprising:
   identifying a maximum recovery point objective for a virtual machine with an associated virtual machine disk file on a storage device that possesses hardware snapshot capabilities;
   identifying an available hardware snapshot of the storage device on which the virtual machine disk file resides, the hardware snapshot having been created using the hardware snapshot capabilities of the storage device;
   determining that a timestamp of the hardware snapshot lies within a period of time defined by the maximum recovery point objective as occurring after an incident that impacts system operation; and
   in response to determining that the timestamp of the hardware snapshot lies within the period of time defined by the maximum recovery point objective, constructing a backup of the virtual machine from the hardware snapshot by extending a retention time of the hardware snapshot to the maximum recovery point objective instead of creating the backup from the virtual machine disk file.

2. The method of claim 1, wherein the hardware snapshot of the storage device on which the virtual machine disk file resides is a device-based hardware snapshot produced by the storage device.

3. The method of claim 1, wherein the hardware snapshot of the storage device on which the virtual machine disk file resides was created by a backup operation not related to the virtual machine.

4. The method of claim 1, wherein the storage device is capable of creating a space-optimized read/write snapshot of a volume of data.

5. The method of claim 1, wherein the storage device possesses replication capabilities and constructing the backup of the virtual machine from the hardware snapshot comprises performing a replication of the hardware snapshot.

6. The method of claim 1, wherein the storage device possesses replication capabilities and constructing the backup of the virtual machine from the hardware snapshot comprises copying a replicated copy of the hardware snapshot.

7. The method of claim 1, further comprising restoring the virtual machine backup by:
   identifying a plurality of hardware snapshots of the storage device on which the virtual machine disk file resides;
   selecting, by comparing characteristics of the plurality of hardware snapshots, a preferred hardware snapshot from within the plurality of hardware snapshots; and restoring the virtual machine backup from the preferred hardware snapshot.

8. The method of claim 1, further comprising restoring the virtual machine backup by copying files pertaining to the virtual machine from the hardware snapshot of the storage device on which the virtual machine disk file resides.

9. The method of claim 1, wherein the storage device possesses hardware snapshot rollback capabilities and the method further comprises restoring the virtual machine backup by performing a hardware snapshot rollback of files pertaining to the virtual machine.

10. The method of claim 1, wherein the storage device possesses replication capabilities and the method further comprises restoring the virtual machine backup by constructing configuration files pertaining to an alternate storage location and replicating the hardware snapshot to the alternate storage location.

11. The method of claim 1, further comprising restoring the virtual machine backup by copying the hardware snapshot to an alternate storage device possessing replication capabilities and replicating the hardware snapshot to the storage device.

12. The method of claim 1, wherein:
the storage device possesses replication capabilities, the hardware snapshot has previously been copied to an alternate storage location, and modifications to the virtual machine disk file have been replicated to an alternate storage device; and
the method further comprises restoring the virtual machine backup by copying the hardware snapshot to the storage device from the alternate storage location and replicating the modifications to the virtual machine disk file from the alternate storage device to the storage device.

13. A system for managing virtual machine backups, the system comprising:
a recovery point objective identification module that identifies a maximum recovery point objective for a virtual machine with an associated virtual machine disk file on a storage device that possesses hardware snapshot capabilities;
a snapshot identification module that:
identifies an available hardware snapshot of the storage device on which the virtual machine disk file resides, the hardware snapshot having been created using the hardware snapshot capabilities of the storage device;
determines that a timestamp of the hardware snapshot lies within a period of time defined by the maximum recovery point objective as occurring after an incident that impacts system operation;
a backup construction module that, in response to determining that the timestamp of the hardware snapshot lies within the period of time defined by the maximum recovery point objective, constructs a backup of the virtual machine from the hardware snapshot by extending a retention time of the hardware snapshot to the maximum recovery point objective instead of creating the backup from the virtual machine disk file; and
at least one processor that executes the recovery point objective identification module, the snapshot identification module, and the backup construction module.

14. The system of claim 13, wherein the storage device is capable of creating a space-optimized read/write snapshot of a volume of data.

15. The system of claim 13, wherein the storage device possesses replication capabilities and the backup construction module constructs the backup of the virtual machine from the hardware snapshot by performing a replication of the hardware snapshot.

16. The system of claim 13, wherein the storage device possesses replication capabilities and the backup construction module constructs the backup of the virtual machine from the hardware snapshot by copying a replicated copy of the hardware snapshot.

17. The system of claim 13, further comprising a backup restoration module that restores the virtual machine backup by copying files pertaining to the virtual machine from the hardware snapshot of the storage device on which the virtual machine disk file resides.

18. The system of claim 17, wherein the storage device possesses hardware snapshot rollback capabilities and the backup restoration module restores the virtual machine backup by performing a hardware snapshot rollback of files pertaining to the virtual machine.

19. The system of claim 17, wherein the storage device possesses replication capabilities and the backup restoration module restores the virtual machine backup by constructing configuration files pertaining to an alternate storage location and replicating the hardware snapshot to the alternate storage location.

20. A non-transitory computer-readable medium comprising one or more computer-executable instructions that, when executed by at least one processor of a computing device, cause the computing device to:
identify a maximum recovery point objective for a virtual machine with an associated virtual machine disk file on a storage device that possesses hardware snapshot capabilities;
identify an available hardware snapshot of the storage device on which the virtual machine disk file resides, the hardware snapshot having been created using the hardware snapshot capabilities of the storage device;
determine that a timestamp of the hardware snapshot lies within a period of time defined by the maximum recovery point objective as occurring after an incident that impacts system operation; and
in response to determining that the timestamp of the hardware snapshot lies within the period of time defined by the maximum recovery point objective, construct a backup of the virtual machine from the hardware snapshot by extending a retention time of the hardware snapshot to the maximum recovery point objective instead of creating the backup from the virtual machine disk file.

* * * * *